(12) United States Patent
Dees

(10) Patent No.: US 10,200,523 B2
(45) Date of Patent: Feb. 5, 2019

(54) WIRELESS COMMUNICATION SYSTEM

(71) Applicant: KONINKLIJKE PHILIPS N.V., Eindhoven (NL)

(72) Inventor: Walter Dees, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 65 days.

(21) Appl. No.: 15/306,846

(22) PCT Filed: Apr. 8, 2015

(86) PCT No.: PCT/EP2015/057549
§ 371 (c)(1),
(2) Date: Oct. 26, 2016

(87) PCT Pub. No.: WO2015/165697
PCT Pub. Date: Nov. 5, 2015

(65) Prior Publication Data
US 2017/0048373 A1   Feb. 16, 2017

(30) Foreign Application Priority Data

Apr. 28, 2014   (EP) ..................... 14166179

(51) Int. Cl.
*H04M 1/725*   (2006.01)
*H04N 21/41*   (2011.01)
(Continued)

(52) U.S. Cl.
CPC ...... *H04M 1/7253* (2013.01); *H04L 12/2809* (2013.01); *H04L 12/2812* (2013.01);
(Continued)

(58) Field of Classification Search
CPC .................................................. H04W 76/02
(Continued)

(56) References Cited

U.S. PATENT DOCUMENTS 6,326,946 B1 * 12/2001 Moran ............... G06F 3/041
340/568.8
2004/0037295 A1    2/2004 Tanaka
(Continued)

FOREIGN PATENT DOCUMENTS

| EP | 2521372 A1 | 11/2012 |
| JP | 2004274532 A | 9/2004 |
| WO | WO2012117306 A1 | 9/2012 |

OTHER PUBLICATIONS

"USB-IF Completes Media Agnostic USB Specification", Beaverton, Ore. Mar. 18, 2014 http://www.usb.org/press/USB-IF_Press_Releases/USBIF_Media_Agnostic_USB_press_release_Final.pdf.
(Continued)

*Primary Examiner* — Ganiyu A Hanidu
(74) *Attorney, Agent, or Firm* — Larry Liberchuk

(57) ABSTRACT

A slave device provides a service to a master device via wireless communication, e.g. via wireless docking. The master device has a graphical user interface arranged for generating a system image (400) for showing node elements (310, 311, 320) graphically representing the devices and services, e.g. on a touch screen. The user may draw a line (410, 420) on the touch screen between selected node elements causing a line drawing input being detected. The slave device now initiates a setup operation between selected devices corresponding to the selected node elements. The setup operation is subsequently performed by establishing a wireless connection between the selected devices. Advantageously, the user intuitively commands a wireless connection to be set up for using a service via wireless communication.

14 Claims, 5 Drawing Sheets

(51) Int. Cl.
*H04L 12/28* (2006.01)
*H04W 84/12* (2009.01)
*H04N 21/414* (2011.01)
*H04N 21/436* (2011.01)
*H04N 21/47* (2011.01)
*G06F 3/0481* (2013.01)
*G06F 3/0482* (2013.01)
*G06T 11/20* (2006.01)

(52) U.S. Cl.
CPC .... *H04L 12/2814* (2013.01); *H04M 1/72533* (2013.01); *H04N 21/4126* (2013.01); *H04N 21/41407* (2013.01); *G06F 3/0482* (2013.01); *G06F 3/04817* (2013.01); *G06T 11/203* (2013.01); *H04M 2250/06* (2013.01); *H04N 21/43615* (2013.01); *H04N 21/47* (2013.01); *H04W 84/12* (2013.01)

(58) Field of Classification Search
USPC .............................................. 455/41.3, 41.2
See application file for complete search history.

(56) References Cited

U.S. PATENT DOCUMENTS

2006/0122985 A1* 6/2006 Yamamoto ........ G06F 17/30604
2006/0258289 A1* 11/2006 Dua ................. G06F 17/30058
   455/41.3
2009/0040179 A1* 2/2009 Lee ....................... G06F 3/0482
   345/158
2015/0319792 A1* 11/2015 Ito ......................... H04W 76/10
   370/329

OTHER PUBLICATIONS

Kamolov, R. et al., "Visualizing Patterns of Flow and Usage in Wireless Networks ", Computational Design & Visualization Lab, Jul. 24, 2013, http://vimeo.com/album/250301.

Khella, A. et al., "Knowledge and Mental Models in HCI", Sep. 2002 http://www.cs.umd.edu/class/fall2002/cmsc838s/tichi/knowledge.html.

Dees W. ' "Usability of Nomadic User Interfaces", Human-Computer Interaction, Part III, HCII 2011, LNCS 6763, pp. 195-204, 2011.

Laviola Jr., J.J. et al., "Sketched-Based Interfaces: Techniques and Applications", SIGGRAPH 2007, Aug. 5, 2007 Course Notes, http://www.cs.ucf.edu/courses/cap6105/fall09/course3.pdf.

Walny, J. et al., "Understanding Pen and Touch Interaction for Data Exploration on Interactive Whiteboards", Journal IEEE Transactions on Visualization and Computer Graphics, v18 Issue 12, Dec. 2012, pp. 2779-2788.

Hong, I.H. et al., "SATIN: A Toolkit for Informal Ink-based Applications", ACM Digital Library, Proceeding UIST '00 Proceedings of the 13th annual ACM symposium on User interface software and technology, pp. 63-72, 2000, http://guir.berkeley.edu/projects/satin.

* cited by examiner

WIRELESS COMMUNICATION SYSTEM

FIELD OF THE INVENTION

The invention relates to a wireless communication system comprising at least two wireless devices including a master device providing a master function and a slave device providing a slave function. The slave device is for providing at least one service and the master device is arranged for using the service. The slave device and the master device are arranged for accommodating the service via wireless communication. Thereto each device comprises a communication unit for the wireless communication, and a processor coupled to the communication unit and arranged for said accommodating the service.

The slave device may have one or more built in peripherals, and/or may be arranged for coupling to at least one external peripheral to constitute a wireless docking environment. Providing the service may involve providing access to a respective peripheral for the master device.

The invention further relates to a wireless device, a wireless device method, and a computer program product for wireless communication between a slave device and a master device.

BACKGROUND OF THE INVENTION

The invention relates to wireless communication, e.g. via Wi-Fi, and more specific to accommodating a service of a wireless slave device to a master device, e.g. providing use of one or more peripherals. In this context peripherals may be external devices like a display, keyboard, or mouse, or peripherals built in a slave device like a loudspeaker or storage unit. For example, a TV may be also a slave device, i.e. the slave function is built in the TV in combination with a number of peripherals internal or external of the TV. Accessing and/or using such peripherals and/or any other internal or external resources of the slave device may be called services provided by a slave device.

Wireless devices, e.g. based on Wi-Fi (as described in IEEE802.11) can offer all kinds of services. These may be services such as video rendering, audio rendering, printing, using a USB device such as a keyboard or a mouse over Wi-Fi, etc. Wi-Fi devices can 'advertise' these services over Wi-Fi, such that it is possible for other devices with a Wi-Fi radio to see what Wi-Fi services are available in their vicinity. A Wi-Fi device may also ask ('probe') another Wi-Fi device about which Wi-Fi services it has to offer. Wi-Fi offers various ways to do such pre-association discovery.

Wireless docking in a wireless communication system having multiple wireless devices including a master device providing a master function and a slave device providing a slave function may be based on using a Wi-Fi based wireless docking station. The slave function may be embedded in a wireless docking station (also called a wireless docking host or WDH) that enables a mobile device (called master device, or MD) to access a set of peripherals locally attached through a wire or wirelessly connected to the slave device (such as USB mouse, HDMI display, Bluetooth headset) through a set of general message exchange protocols over a wireless link (e.g. Wi-Fi). A slave device coupled together with one or more wired or wireless peripherals is called a wireless docking environment. A slave device may also be a further mobile device having available one or more services for a master device. As such, wireless docking is known, for example, from WO 2012/117306A1.

The wireless slave device may provide information about its presence through a Wi-Fi beacon that master devices can use to select and initiate connections with a chosen slave device.

US2006/0258289 describes a wireless media player and a related system. The media player may wirelessly connect to other devices in the system. A list of devices may be shown on a display to enable the user to select a device to connect. When connected, the display may indicate, by an icon or text, a currently connected device.

EP 2521372 describes using Near Field Communication (NFC) for enabling remote control of electronic devices. A mobile device is positioned within NFC range of a first external device (so-called tagging) to receive first device information via NFC. Subsequently the mobile device communicates with a second external device for transferring the first device information, which may enable a connection between the second external device and the first external device. Also the mobile device may remote control the second external device.

SUMMARY OF THE INVENTION

The user of a Wi-Fi device may select a device offering one or more services from a list of discovered devices in range and may try to connect with it to use one or more services. Since the range of Wi-Fi signals can reach tens of meters, quite a number of devices offering Wi-Fi services may be discovered within Wi-Fi range. The user may be involved in selecting the correct device/service to connect to. However, understanding and perceiving connection options between multiple devices and/or services available to the user may be difficult. The user of a master device may be presented with a list of available slave devices and for each slave device the list of available services. Selecting one of the slave devices and/or related services may be complicated. Also the roles of the devices, i.e. master or slave, are not always very clear, since devices may be able to perform multiple roles (sequentially or concurrently).

It is an object of the invention to provide a system for wireless communication that enables setting up a connection and acquiring services while reducing the complexity of user interaction and time needed.

For this purpose, according to a first aspect of the invention, in the wireless communication system as described in the opening paragraph, a first device of the at least two wireless devices comprises a graphical user interface comprising a display, an interaction element for receiving user input and a graphical control unit coupled to the display and the interaction element. The graphical control unit is arranged for generating a system image for showing node elements and connection elements between the node elements, a respective node element graphically representing one of the master device, the slave device or the at least one service, and a respective connection element graphically representing a wireless connection or service session, the system image comprising at least three node elements including a first node element representing the first device; selecting devices to be connected by receiving, via the interaction element, a line drawing input indicative of a line drawn in the system image by the user between two selected node elements of the at least three node elements; and upon receiving the line drawing input, initiating a setup operation for a wireless connection or service session between the selected devices corresponding to the selected node elements. The processor is arranged for subsequently performing the setup operation by establishing a wireless connection or service session between the selected devices.

For this purpose a wireless device for use as the first device in the above system comprises a graphical user interface comprising a display, an interaction element for receiving user input and a graphical control unit coupled to the display and the interaction element,
wherein the graphical control unit is arranged for generating a system image for showing node elements and connection elements between the node elements, a respective node element graphically representing one of the master device, the slave device or the at least one service, and a respective connection element graphically representing a wireless connection or service session, the system image comprising at least three node elements including a first node element representing the first device; selecting devices to be connected by receiving, via the interaction element, a line drawing input indicative of a line drawn in the system image by the user between two selected node elements of the at least three node elements; and upon receiving the line drawing input, initiating a setup operation for a wireless connection or service session between the selected devices corresponding to the selected node elements, and the processor is arranged for performing the setup operation by establishing a wireless connection or service session between the selected devices.

For this purpose, a method of initiating wireless communication is provided for use in a wireless device as the first device in the above system, the wireless device comprising a graphical user interface comprising a display and an interaction element for receiving user input, the method comprising generating a system image for showing node elements and connection elements between the node elements, a respective node element graphically representing one of the master device, the slave device or the at least one service, and a respective connection element graphically representing a wireless connection or service session, the system image comprising at least three node elements including a first node element representing the first device; selecting devices to be connected by receiving, via the interaction element, a line drawing input indicative of a line drawn in the system image by the user between two selected node elements of the at least three node elements; and upon receiving the line drawing input, initiating a setup operation for a wireless connection or service session between the selected devices corresponding to the selected node elements, and the processor is arranged for performing the setup operation by establishing a wireless connection or service session between the selected devices.

The measures have the effect that, in the wireless communication system, accommodating a service is set up as follows, e.g. in a docking process. The user of the wireless device, for example a mobile phone or tablet, interacts with its graphical user interface. The graphical user interface for example has a high resolution touch screen built in the mobile device, or a separate display and mouse, constituting the display and interaction element. A system image is generated on said display showing multiple, i.e. at least three, symbols or icons as node elements that each graphically represents a wireless device or a wireless service. A wireless service may be a function performed by a wireless device itself or making available a peripheral via a wireless device, so selecting a node element effectively results in selecting the device it represents or the device that provides said service. The system image may further show connection elements, e.g. lines or other graphical representations of wireless connections that are already established between the node elements. Hence the system image is a graphical overview showing a multitude of selectable node elements, each representing a device or service. Then, for selecting two devices that are to be connected, a line drawing input is received via the interaction element, due to the user drawing a line on the display between two icons of devices or services, i.e. indicative of a line drawn in the system image by the user between selected node elements. Such line is manually drawn and hence need not be straight or actually from the exact locations of the node elements, but may be snapped to such locations or straightened by the graphical unit. Upon receiving the line drawing input, a setup operation is initiated between the two selected devices corresponding to the selected node elements. Subsequently the setup operation is performed by establishing a wireless connection between the selected devices, after which the corresponding sessions are set up to use the selected services. Advantageously, the user is enabled to intuitively select the slave device by graphically drawing a line between the master device and the respective slave device or services provided by the slave device. So it is automatically determined that the master device requires a service of the slave device by the user drawing said line connecting to the icon of the master device, which usually is the user's portable device. Drawing a line between the icon of the master device and the icon of the slave device can be indicative of selecting all the services of the slave device to be selected for use, whereas drawing a line between the master device and one or more icons of the slave device can be indicative of selecting only a subset of all the services offered by the slave device. The master device and slave device now directly engage in connecting or docking, as said setup operation identifies both the master and slave device or service. Hence the user perceives a direct and simple way of setting up a required link to a service due to the visual image and interaction of drawing said line.

Optionally, in the above wireless communication system, the at least one service comprises accessing and using at least one of a peripheral externally coupled to the slave device; an internal resource of the slave device; a network connected to the slave device. Advantageously, in practice, such peripherals or resources of the slave device, or a host device, are made available to a master device, or dockee device.

Optionally, in the above wireless communication system, a second device of the at least two wireless devices comprises a display, and the graphical control unit in the first device is arranged for transferring the generated system image to the second wireless device, and the second wireless device is arranged for receiving the generated system image and displaying the generated system image via the display. Advantageously, the second device is enabled to display said system image without gathering the required information about the wireless devices and services. The user of the second device now may review, or actively control, the connections by manipulating a respective interaction element, like a mouse or touch screen. Subsequently the corresponding setup operation is generated, and may automatically be performed by the processor of the second device cooperating with the first device.

Optionally, in the above wireless device for use in the wireless communication system, the graphical control unit is arranged for receiving, via the interaction element, a line erasing input indicative of removing a connection element between selected node elements in the system image by the user, and upon receiving the line erasing input, initiating a tear down operation that identifies the selected node elements and an existing connection, and the processor being arranged for performing the tear down operation by tearing down the existing connection or service session between the selected node elements. For example, the graphical user interface may show an eraser icon, which may be moved via the interaction element to erase an existing connection. Advantageously, the user is enabled to intuitively instruct the wireless communication system to end the use of a service and to tear down a connection or service session.

Optionally, in the above wireless device for use in the wireless communication system, the graphical control unit is arranged for selecting a master or slave function by receiving, via the interaction element, a line direction input indicative of a origin node where the line drawn in the system image by the user originated and/or a destination node where the line drawn in the system image by the user ended, and the processor is arranged for, upon receiving the line direction input, performing the master function if the device corresponds to the origin node and/or the slave function if the device corresponds to the destination node. When the user draws said line via the interaction element, inherently one of the node elements will be connected first, and a further node element secondly. So a direction of the line is established by the user drawing action, and is derived by the graphical control unit as the separate line direction input while identifying the origin node and destination node. It is noted that, initially, the wireless devices may not be active in the master or slave role. Advantageously the master function and/or slave function are now selected and automatically assigned to the respective devices based on the line direction input. The user intuitively selects said master/slave functions by drawing the line in a selected direction. In an equivalent embodiment the roles may be selected opposite, i.e. based on the line direction input performing the slave function if the device corresponds to the origin node and/or the master function if the device corresponds to the destination node.

Optionally, in the above wireless device for use in the wireless communication system, the graphical control unit is arranged for selecting a master or slave function by receiving, via the interaction element as the line direction input, a direction reversal input indicative of a line drawn from a pre-existing destination node to a pre-existing origin node of a pre-existing connection, and the processor is arranged for, upon receiving the line direction input, changing a master function of the pre-existing origin node into a slave function if the device corresponds to the pre-existing origin node and/or changing a slave function of the pre-existing destination node into a master function if the device corresponds to the pre-existing destination node. When a direction of a line corresponding to an existing connection is established by a user drawing action, and the direction is derived to be reverse to the direction of the existing connection, the graphical control unit generates a direction reversal input for the origin node and destination node. It is noted that the wireless devices are already active in the master and slave role. Advantageously the master function and/or slave function are now selected and automatically re-assigned to the respective devices based on the direction reversal input. The user intuitively changes said functions by drawing the line in a reverse direction. In an equivalent embodiment the roles Optionally, in the above wireless device for use in the wireless communication system, the processor is arranged for wirelessly receiving information from another device of the at least two wireless devices about its services, wireless connection capabilities and/or ongoing connections, and/or the processor is arranged for wirelessly transmitting information to another device of the at least two wireless devices about its services, wireless connection capabilities and/or ongoing connections. Advantageously, in practice, such information is available from various communication protocols, and is subsequently used to generate the corresponding node elements and/or select appropriate icons in the system image. In practice, the information may be pre-association information in beacon frames, or probe response frames in response to probe requests, or in GAS frames according to Wi-Fi standard IEEE 802.11. Optionally, the information in said frames is extended with service specific information elements or attributes that provide service specific information. For example, said service specific information is indicative of a graphical icon to be used in the respective node element in the system image.

Optionally, in the above wireless communication system, the graphical control unit is arranged for accessing a database of icons for retrieving an icon for generating the node element corresponding to a respective master device, slave device or service. Such a database may be stored in a memory of the respective wireless device, or may be available in a remote server accessible via a network, e.g. the internet.

Optionally, the graphical control unit is arranged for determining spatial distance between the wireless devices, and representing the relative spatial distances in the system image. Advantageously the user is enabled to determine the distance to the device providing a service.

Optionally, the graphical control unit is arranged for applying constraints to the line drawing in dependence of device limitations to prevent connections or service sessions to be set up that exceed the device limitations of devices corresponding to the selected node elements. Advantageously the user is prevented from drawing a line that would suggest a connection or service session which cannot be accommodated.

The method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer. In an embodiment, the computer program comprises computer program code means adapted to perform all the steps of a method according to the invention when the computer program is run on a computer. The computer program may be embodied on a computer readable medium.

Any of the above options may be combined in a device or method being able to support either the role of the master device or the slave device, or the roles of P2P Client and P2P Group owner. Also a single device may have the slave device function in a first wireless docking environment, and also be a master device to a different wireless docking environment. Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
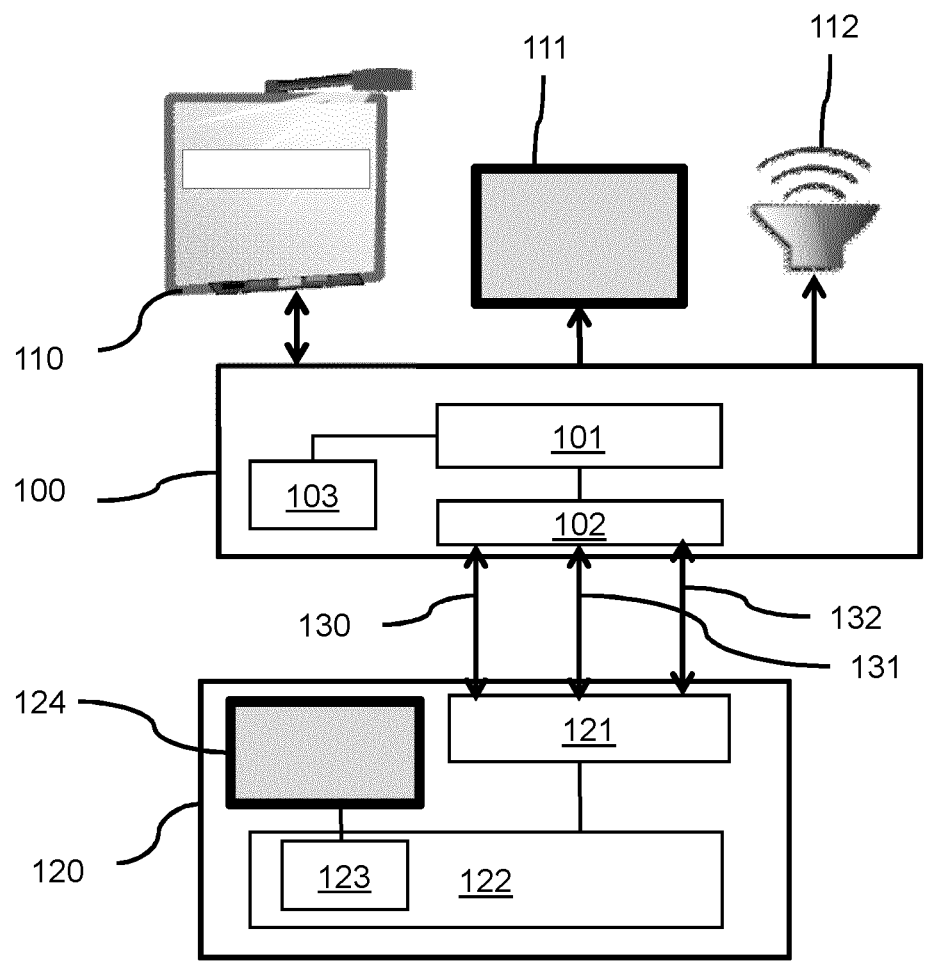
FIG. 1 shows a wireless communication system.

In this document wireless docking is about enabling mobile devices (so called master devices, wireless master devices or MDs) to wirelessly connect to a slave device providing services, e.g. by making available peripherals that are built in and/or coupled to the slave device, so that applications on the mobile device can make use of these services to improve the experience and productivity of working/interacting with these applications. The discovery/advertisement of services, and managing the connections to peripherals, is performed by a slave device also called a wireless docking host (WDH), which makes functionality available through a wireless docking protocol.

Possible master devices include (but are not limited to) mobile phones, laptops, tablets, portable media players, cameras, electronic watches. Possible slave devices include (but are not limited to) dedicated wireless docking station devices, display devices, audio devices, printers, PCs. The wireless docking slave device may also be a small (PC like) dongle with a display, USB and audio interface. Possible peripherals include (but are not limited to) mice, keyboards, display devices, audio devices, webcams, printers, storage devices, USB hubs, network interfaces. These peripherals may be wireless and may support standards such as Wi-Fi Miracast or Media Agnostic USB over Wi-Fi (as further described in "USB-IF Completes Media Agnostic USB Specification" available via: http://www.usb.org/press/USB-IF_Press_Releases/USB-IF_Media_Agnostic_USB_press_release_Final.pdf) to make their functionality available through the wireless network to other devices such as master devices and WDHs. Wired peripherals may be connected to the wireless slave device (e.g. USB, HDMI, DVI, VGA, analogue audio, analogue video, etc). Next to services providing access to peripherals, other services may include e.g. providing remote desktop access or access to certain applications, database access (e.g. document archive), network file system access, access to internet and specific internet services, home network services such as DLNA or UPnP services, etc.

Typically, the master device and the slave device each comprise a microprocessor which executes appropriate software stored at the device; for example, that software may have been downloaded and/or stored in a corresponding memory, e.g., a volatile memory such as RAM or a non-volatile memory such as Flash (not shown). Alternatively, the devices may, in whole or in part, be implemented in programmable logic, e.g., as field-programmable gate array (FPGA). Master device and slave device devices may be implemented, in whole or in part, as a so-called application-specific integrated circuit (ASIC), i.e. an integrated circuit (IC) customized for their particular use. Also, the functions and units as described below may be implemented at least partly in hardware circuits, which may include a processor circuit and storage circuit, the processor circuit executing instructions represented electronically in the storage circuits.

Wireless connectivity is very versatile and allows many dynamic connections to be made, that are invisible to the user. Unlike wired connectivity where the relationship between devices is quite clear. For example in wireless docking, unlike wired docking, the wireless nature of the connection allows in principle to connect a plurality of portable devices simultaneously be docked to the same docking station. It also allows a single portable device to be connected to multiple wireless peripherals or wireless docking hosts at the same time. Also the role that a device takes (e.g. Wireless Docking Host device versus Wireless Dockee, service seeker role or service advertiser role, USB host role versus USB hub/peripheral role, Miracast source versus Miracast sink role) may be dynamic, as well as who is P2P Group owner or P2P Client within a P2P group. In addition, a device may support multiple roles, but may also have some limitations as to how many roles or simultaneous connections it can support. Also, even if a device supports multiple roles, once a certain role is chosen, the device may not support the other role anymore, until all connections/sessions have been closed. Also, a device may be constrained in how many P2P connections it can run simultaneously, whilst remaining connected to a WLAN AP for Internet connectivity. Also, limitations may exist in the devices Wi-Fi chipset in which bands/channels it can operate (simultaneously), e.g. to enable 60 GHz operation with one device whilst simultaneously be connected on 2.4 GHz to another device. The services itself may also be limited in that they allow only a single session, since they may require exclusive use of underlying hardware, e.g. display output. Also, if the service is meant for operating a USB peripheral with the master acting as a USB host, then once it is in use by another USB host (local on the slave device itself or through some other master device), then the USB peripheral cannot be used by another device until the USB host disconnects or tears down its service session. Such restrictions may be hard to understand and/or not immediately visible for the user. Advantageously, line drawing in the graphical user interface can be constrained to only allow new lines to be drawn if the devices has verified based on received capabilities/restrictions that a new connection and/or session is possible. If a user began to draw a line between two nodes in the user interface, some visual or audio feedback will be given to make clear to the user that such connection is not possible. Visual or audio feedback may include the line to change color (e.g. red or greyed out), audio alarm, causing the line to flicker or through some other visual highlight.

In wireless docking it may happen that the set of peripherals available for a wireless dockee (WD) to dock with is not the full set of peripherals of the wireless docking host (WDH). For example in case of multiple WDs connecting to the same WDH, the peripherals are typically assigned to only a single WD, since many peripherals can only support a single master (exclusive peripherals versus shared peripherals) as typically the case for USB peripherals, or can only be usefully used on a single master as typically the case for Human Interaction Device (HID) peripherals as mouse, keyboard. In case of multiple WDs connecting to the same WDH, this means that a WD chooses its own subset of peripherals to use. This subset can be chosen dynamically from the set of all available peripherals or can be a predefined subset (called wireless docking environment). Furthermore, peripherals may be occupied for other reasons (e.g. local use on a device) or may have been disconnected, in sleep mode, out of range, etc. Hence, it is not clear for the user of a WD which peripherals will and/or have been assigned to his WD.

Due to the wireless and dynamic nature, it can be very confusing for an end-user to understand what is happening and retain control. In particular in the case of multiple dockees, multiple docking hosts, multiple wireless peripherals and concurrent roles supported by some devices, it becomes a rather complex system for the user to understand and interact with. This system described here overcomes this by having an automatically generated representation of the wireless docking system that is easy to understand and that can be interacted with in an easy manner. It is noted that the same holds for other similar wireless systems, where there is a master/slave relation between the devices, for example in case of two devices supporting Media Agnostic USB over Wi-Fi where one of the devices takes the role of USB host and the other device takes the role of USB Hub/peripheral, or in case of remote display/content rendering over Wi-Fi where one device takes role of the source and another device takes the role of the sink. Also, in these cases, it is important to be able to hide the complexity of the underlying system to the user, whilst at the same time provide sufficient control and an easy/intuitive way of interacting with the system.

FIG. 1 shows a wireless communication system. The system includes a slave device 100 for wireless communication with a master device 120, for example a mobile phone, laptop or tablet computer. The slave device is coupled to a number of peripherals 110,111,112 to provide services, e.g. rendering audio or video (AV) data. It is noted that in this document AV data is used for any type of video data, audio data or a combination of video and audio data. The peripherals may include video output devices like a beamer or a display 111, graphical input/output devices like a smartboard 110 or a touch screen, audio output devices like a loudspeaker system 112 or a headphone, user input devices like a mouse or a room control unit; data processing devices like a data storage unit or a printer.

The slave device 100 has a slave device communication unit 102 for accommodating wireless communication, for example a Wi-Fi unit, well known as such. The slave device further has a slave device processor 101 arranged for docking at least one master device. The process of docking a wireless device to a wireless docking slave device is a process of establishing a data link via the available radio channel such as Wi-Fi or Bluetooth, and is known as such as discussed above with reference to WO 2012/117306A1. A description of Bluetooth can be found, for example, in Bluetooth Specification, Core Package version 2.1+EDR, issued: 26 Jul. 2007. The docking process involves providing access to one or more services for the master device, e.g. accessing one or more of the peripherals 110,111,112 as indicated by respective arrows 130,131,132.

The master device 120 has a communication unit 121 for the wireless communication, and a master device processor 122 coupled to the communication unit and arranged for said docking. In practice, there may be multiple communication units for that purpose, for example Bluetooth, Wi-Fi and 60 GHz (e.g. WiGig). The master device processor 122 is arranged for docking with the slave device for, as a master device, getting access to the at least one service.

One of the ways to make wireless connectivity simpler for the user is wireless docking. In wireless docking, a so called wireless docking slave device makes a number of services available to a mobile device, with which the mobile device can setup communication in one go. Any group of peripheral devices and/or services made available by a wireless docking slave device is called a wireless docking environment. A wireless docking environment may contain a single slave device and multiple peripherals, or a wireless docking slave device may accommodate a number of (different) wireless docking environments. A wireless docking slave device may also make its services available by individual selection of each one. There may also be a number of wireless docking slave devices in reach of a mobile device to dock with.

The master device 120 has a graphical user interface comprising a display 124, an interaction element for receiving user input and a graphical control unit 123 coupled to the display and the interaction element. For example the interaction element (not shown as such) is a touch screen sensitive to the user's fingertips touching the screen, or a mouse that controls a cursor on the screen. The graphical control unit may be a separate processor for generating display signals and receiving touch screen signals, or may be implemented as a function of the processor 122, e.g. by firmware. The graphical control unit is arranged for generating a system image comprising node elements, as further described with FIG. 3. A respective node element graphically represents one device or service, e.g. the master device, the slave device or the provided service. The system image may also show a connection element between the node elements graphically representing a wireless connection between the devices represented by the connected node elements. It is assumed that the user wants to use a service, e.g. a display or printing service. Hence, on the display screen, he draws a line from his device to the required service using the touch screen as interaction element. So a line drawing input is received indicative of a line drawn in the system image by the user between selected node elements. The graphical control unit initiates, upon receiving the line drawing input, a setup operation between selected devices corresponding to the selected node elements. The operation may be transferred to the processor or processor unit that controls the wireless communication set up. The processor performs the setup operation by establishing a wireless connection between the selected devices.

Traditionally the above mentioned devices may employ Wi-Fi communication to make their wireless docking environment or their function wirelessly available, e.g. by using Wi-Fi Direct. Setting up a Wi-Fi connection requires quite some steps to be taken and the exchange of a number of messages before the two devices are 'associated' over Wi-Fi. This may require quite some user involvement to make sure that the correct devices are going to be connected. When two devices are associated over Wi-Fi, their Wi-Fi connection is protected cryptographically and an IP connection is established.

Wi-Fi devices can make themselves discoverable wirelessly. This can be done before two devices are associated, so this is called pre-association discovery. There are several types of pre-association discovery. One is pre-association device discovery, whereby a device and some properties of the devices like its name, function, etc. can be discovered. This may be done through beacon frames and probe request frames and probe response frames, well known from IEEE 802.11. Another type is pre-association service discovery, with which the services, e.g. printing, display, etc., offered by a Wi-Fi device can be discovered through IEEE 802.11u Generic Advertisement Service (GAS) frames by others.

Such discovery may include information about wireless docking environments being offered for wireless docking.

Optionally, in the above wireless communication system, the wireless communication is according to a Wi-Fi standard for peer to peer communication, in particular as described in the Wi-Fi P2P standard. Advantageously, in practice, such a Wi-Fi standard enables many existing devices to be incorporated in the wireless communication system by adding an appropriate application embodying the new functions of the graphical control unit as described. Usually, Wi-Fi P2P connections are encrypted and authenticated using Wi-Fi Protected Setup. Based on the supported configuration methods for Wi-Fi Protected Setup of the devices or services represented in the graphical UI, the master device may choose the configuration method to use based on the following order of preference and representation in order to reduce the amount of user interaction needed beyond drawing lines in the graphical user interface:

1) Reinitiate persistent P2P group using previously stored pairing credentials. Does not require any further user interaction.
2) Use the Wi-Fi Direct Services default configuration method using a fixed pre-determined PIN. Does not require any further user interaction.
3) If already connected to a wireless docking host, verify if the wireless docking host enables wireless docking host assisted pairing method or Tunneled Direct Link Setup (TDLS) enabling the exchange of credentials for Wi-Fi devices managed by the wireless docking host, and using these credentials for direct connection setup with these Wi-Fi devices without further user intervention.
4) If already connected to a wireless docking host, verify if the wireless docking host enables a relay connection through the wireless docking host between the master device and a selected Wi-Fi device as slave device, enabling the use of the services of the selected Wi-Fi slave device without further user intervention.
5) Automatically initiate Push-Button pairing method upon drawing a line between master device and slave device. Notify the user through the graphical UI to press the respective button for Push-Button pairing on the slave device.
6) If none of the above configuration methods are available, then choose one that requires the least amount of user intervention. In practice this likely means reverting to the PIN methods 'Keypad' or 'Display' and requiring to type in the PIN in a text box (e.g. near the drawn line in the graphical user interface).

Figure 2:
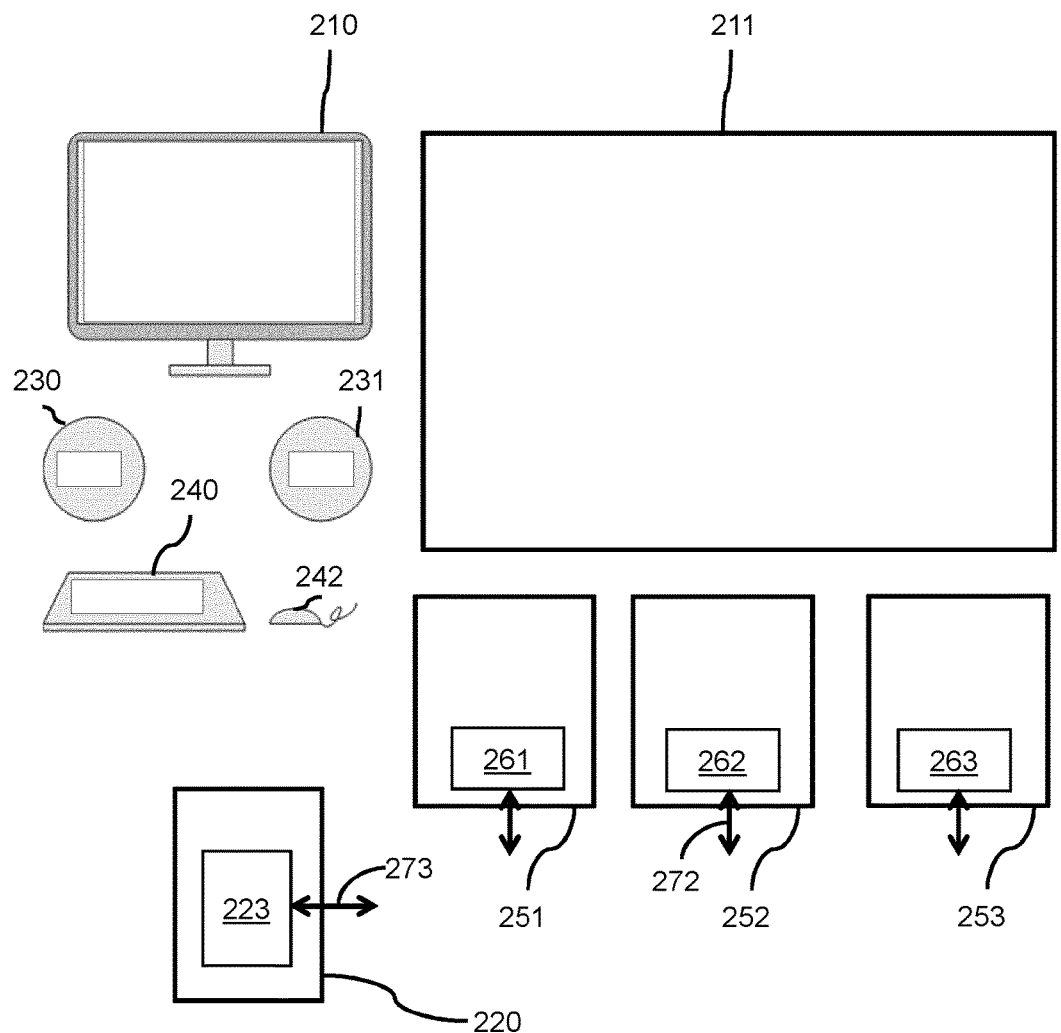
FIG. 2 shows an example of a wireless communication system having multiple slave devices.

FIG. 2 shows an example of a wireless communication system having multiple slave devices. The figure shows three slave device devices 251,252,253 connected to a set of peripherals, for example a display 210, a projection screen 211, personal audio 230 or public audio speakers 231, a keyboard 240 and a mouse 242. The connection between a respective slave device and individual peripherals is not known to the master device 220 or its user. Further peripherals may also be coupled via peripheral interfaces, like an Ethernet connection for high speed access to peripherals or internet access to be used by the master devices, a USB interface which may support multiple peripheral connections, or HDMI. The respective slave devices 251, 252, 253 may each provide one or more services, which are all available to the master device 220. Each slave device has a communication unit 261, 262, 263 for wireless communication with the master device. This may be through direct Wi-Fi connection or through bridging. The master device has a communication unit 223. The master device may select a service on the graphical user interface as described with FIG. 3 by drawing a line to selected slave device. This makes it easy and intuitive for the user to select a peripherals to dock with, instead of having to go through several lists and selection steps. The lines that the user draws also make the relation between the devices and peripherals easy to understand. Instead of a one to one correspondence between lines and wireless links or sessions, the link drawn in the graphical user interface may hide underlying connection details. For example, whether or not a Wi-Fi P2P connection or a relay connection is set up between a master device and a Wi-Fi peripheral connected/managed by a wireless docking host after drawing a line between the master device and the Wi-Fi peripheral may be hidden from the user and decided by the wireless docking host or dockee based on the capabilities of the wireless docking host and/or dockee.

Optionally the user is made aware of the above underlying choices. The user may draw a different kind of line in the case of a relay connection versus a direct connection. For example, if the user draws a direct line, then a direct connection is set up. If the user draws a two angled connected lines (e.g. as a caret symbol '^'), then a relay connection is set up between the master device and the Wi-Fi peripheral.

Figure 3:
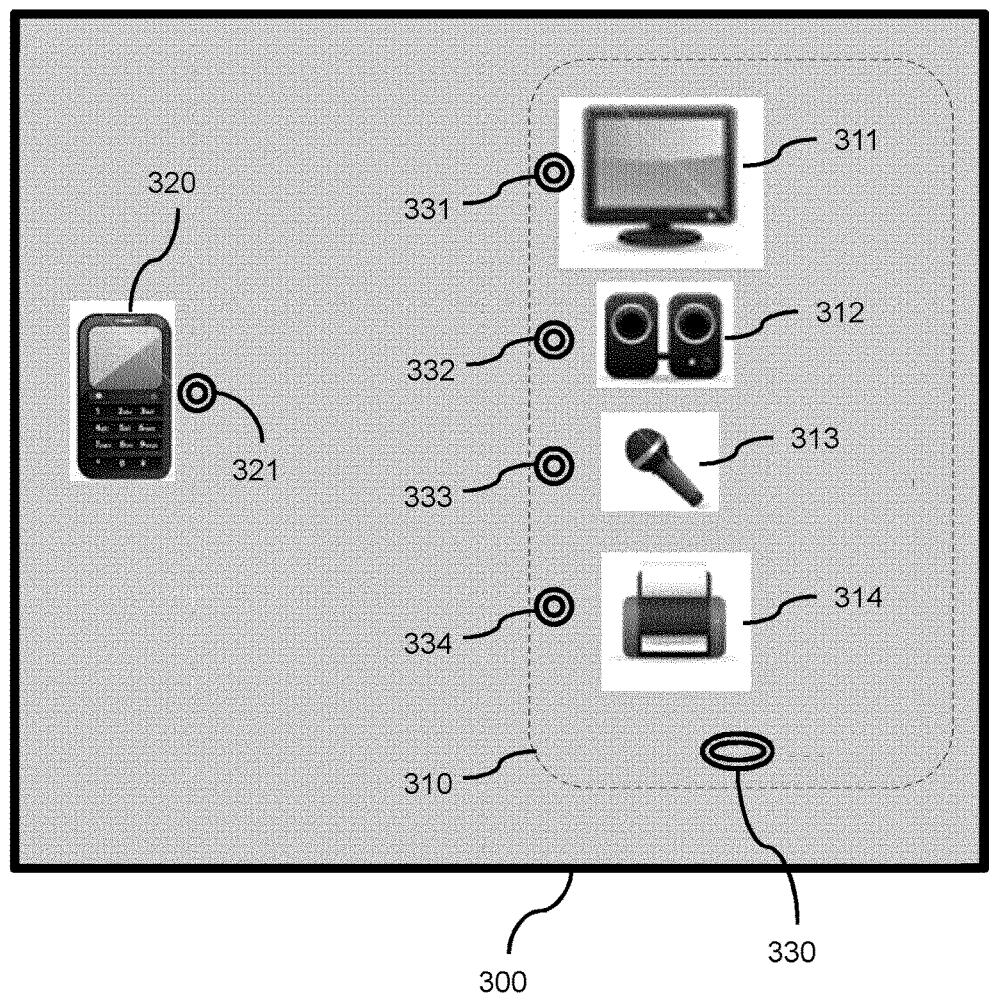
FIG. 3 shows an example of a display of a graphical user interface showing a system image of a wireless communication system.

FIG. 3 shows an example of a display of a graphical user interface showing a system image of a wireless communication system. Each element in the system is graphically represented by a node element, e.g. an icon and/or a connection symbol. A display 300 is shown while displaying the system image representing the wireless communication system having master device 320, for example by an icon showing a mobile phone and a symbol 321, and a slave device 310 indicated by a dashed line and a connection symbol 330. A number of peripherals is coupled to the slave device, each peripheral providing a respective service. A display peripheral 311 has a connection symbol 331, an audio output peripheral 312 has a connection symbol 332, an audio input peripheral 313 has a connection symbol 333, and a printer 314 has a connection symbol 334. The symbols may also indicate the actual availability of the service, e.g. green indicating that the service is available and red indicating that the service is currently unavailable. The user may draw one or more lines between the master device and selected services, i.e. between the respective connection symbols. Optionally, different line types may be provided for a wireless connection or a session with a service, for example a straight line for a wireless connection and dotted lines or a triangular line pattern for a session. The user interface may provide a selection mechanism for the line type to draw, or may detect, and respond to, relevant touch gestures. Furthermore, audio and/or visual feedback may be generated when applying certain constraints to drawing lines in the graphical user interface.

The graphical user interface in a wireless device is configured to generate the system image, e.g. a bitmap, with a graphical representation of the devices and their connected peripherals. The graphical user interface is capable of drawing/sketching and erasing lines on the system image. Each such line represents a connection and/or session between a master device and a set of one or more the peripherals/services offered for docking by the slave device(s). The slave device is further configured to set up (or tear down) the session, and an underlying wireless connection if needed, between the master device and the selected peripherals/services. The connection session may be represented in the image by changing of the line or line connector point, or remove the line if such session is not possible or gets broken/torn down.

So, the graphical control unit may be arranged for receiving, via the interaction element, a line erasing input indicative of removing a connection element between selected node elements in the system image by the user. Upon receiving the line erasing input, the graphical control unit initiates a tearing down operation that identifies the selected node elements and an existing connection. The processor subsequently performs the tearing down operation by tearing down the respective existing connection(s) and/or session(s) between the selected node elements.

Optionally, the graphical control unit is arranged for receiving, via the interaction element, a line direction input indicative of an origin node where the line drawn in the system image by the user originated and/or a destination node where the line drawn in the system image by the user ended. The processor is arranged for, upon receiving the line direction input, performing the master function if the device corresponds to the origin node and/or the slave function if the device corresponds to the destination node. In practice, a wireless device may offer both wireless master function and wireless slave function, and the device is further configured to determine the role of wireless dockee/master for a session between the device and a set of peripherals offered for docking based on the starting point of a line being drawn by the user on the system image. The direction of the line may graphically be indicated by a directed arrow. Also, the graphical control unit may be arranged for receiving, via the interaction element as the line direction input, a direction reversal input indicative of a line drawn from a pre-existing destination node to a pre-existing origin node of a pre-existing connection. The processor is arranged for, upon receiving the line direction input, changing a master function of the pre-existing origin node into a slave function if the device corresponds to the pre-existing origin node and/or changing a slave function of the pre-existing destination node into a master function if the device corresponds to the pre-existing destination node. In practice, this makes it easy for the user to configure the master/slave relationship between a device using peripherals (i.e. wireless dockee) and a device offering peripherals (i.e. wireless docking host), which needs not to be predetermined.

There may be some limitations on supporting concurrent roles, for example a Miracast sink is often not able to simultaneously be a Miracast source The master role can be indicative of, performing the service seeker role initiating the discovery and P2P connection setup, performing the USB host role in case of Media Agnostic USB over Wi-Fi, performing the Dockee role in case of wireless docking with a wireless docking host, performing the Miracast source role in a Miracast session in case of Wi-Fi Miracast, performing the P2P Group Owner role or performing the P2P Client role in a P2P group, running the primary user interface towards the user, etc. The slave role can be indicative of performing the service advertiser role enabling discovery of its services, performing the USB hub or USB peripheral role in case of Media Agnostic USB over Wi-Fi, performing the Dockee role in case of wireless docking with a wireless docking host, performing the Miracast sink role in a Miracast session in case of Wi-Fi Miracast, performing the P2P Client role or performing the P2P Group owner role in a P2P group, forwarding user interface actions to the master device, etc.

In order to generate the system image and enable the user interaction mechanism described above, at least one of the wireless devices in the system needs to gather information about the wireless connection capabilities/restrictions, ongoing connections, support for different roles in the system, concurrency/resource restrictions, of the other device(s) in the system. Preferably, this is done by gathering pre-association information made available in 802.11 beacon frames or probe responses to probe requests, or through 802.11u GAS frames. These frames are typically extended with function/service specific information elements or attributes that provide function/service specific information. For example, the Wi-Fi P2P spec provides information such as a friendly device name, device type and whether the device is capable of participating in more than one P2P Groups, and supported WPS configuration methods. For wireless docking this can be extended with information such as which peripherals are available for docking, how many simultaneous sessions may be supported, a device's preference of being P2P Group Owner or P2P Client, whether or not a device supports bridging or assisted direct connection setup to external Wi-Fi peripherals. Alternatively or in addition, some of the information may be gathered after association and setting up an IP connection between the devices, e.g. by fetching service/device specific information through UPnP.

Figure 4:
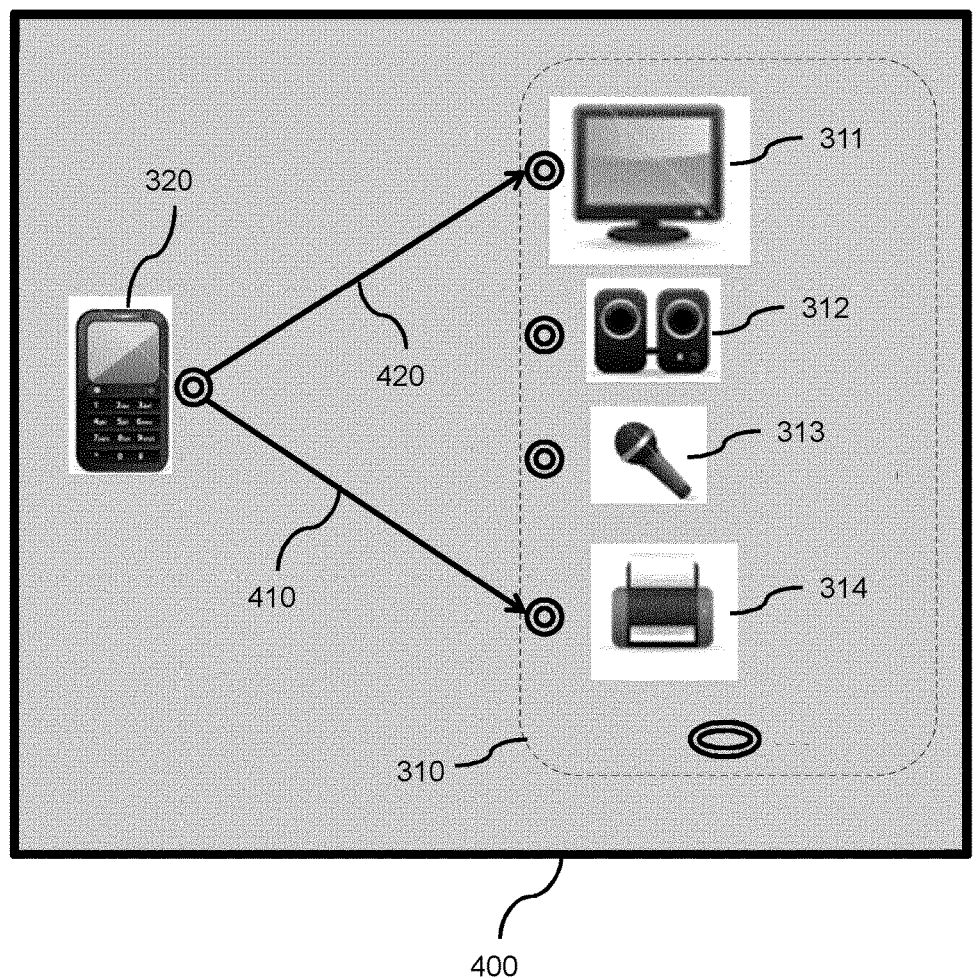
FIG. 4 shows an example of a display of a graphical user interface showing a system image of a wireless communication system having drawn connection lines.

Using the information gathered, the system image can be generated to represent the devices/peripherals in the system, as illustrated in FIGS. 3 and 4. In order to do so, the device generating the system image may use pre-defined icons to represent devices and peripherals, e.g. by searching through a database of icons based on the Device Type provided through Wi-Fi P2P, or e.g. USB device class in case of Media Agnostic USB over Wi-Fi. Alternatively, the icons are provided by the other devices in the wireless network, e.g. using 802.11GAS frames or UPnP, or by providing URLs to be able to fetch icons from the Internet through HTTP. The device generating the system image may display this system image to the user as part of its user interface. Alternatively, it may transfer the system image to another device in the network, e.g. using a UPnP action, that will render the system image as part of its user interface.

The device generating the user interface determines a set of anchor points in the system image associated with each device/peripheral represented in the system image. The anchor points may be the graphical icons, or corresponding connection symbols as shown in FIGS. 3 and 4. When a user starts drawing a line using an human interaction device (HID such as mouse, touch screen), the anchor point that is closest to the initial coordinate of the line determines the starting point of the line, and hence can be used to determine the role (e.g. wireless dockee/master or wireless docking host/slave) that a device will take in the corresponding service session. This anchor point can be further used for "snapping", i.e. by automatically starting to draw a line from the anchor point, instead of the initial coordinate upon which a line drawing action by the HID device was detected. A line may be drawn using free form drawing/sketching (e.g. exactly following the coordinates of the HID device) or by automatically drawing a straight line between an anchor point and the current coordinate of the HID device or another anchor point. The anchor points may be invisible, but may also be rendered as part of or on top of the system image. In the FIGS. 3 and 4, the anchor points are indicated by donut shaped symbols.

FIG. 4 shows an example of a display of a graphical user interface showing a system image of a wireless communication system having drawn connection lines. The Figures shows the same system elements as FIG. 3 on a display 400. A first line 410 representing a first connection element is drawn from master device 320, for example from its connection symbol, to the connection symbol of printer 314. A second line 420 representing a second connection element is drawn from master device 320 to the connection symbol of display peripheral 311 indicating a selected display service.

Different colors or some other visual or audio feedback may be used to indicate any connectivity constraints, e.g. red or light grey color to indicate that a peripheral is occupied/disconnected or that the number of concurrent connections/sessions is exceeded, or that some other resource constraints are exceeded. The device providing the user interface may reject drawing a line to an anchor point if it would not be possible to establish a session to the device/peripheral/service represented by that anchor point, e.g. when the connection symbol has the color red. Based on the drawn lines, the corresponding peripherals are selected for use by the wireless dockee/master, e.g. by issuing a SelectPeripherals UPnP action with the identifier of the peripherals as arguments. Corresponding service sessions may be set up in order to start using these peripherals over Wi-Fi through service specific messaging/streaming protocol, such as Media Agnostic USB over Wi-Fi or Wi-Fi Miracast.

In order to tear down a session, the device providing the user interface may offer an "eraser" function to delete drawn lines, or may detect a "cutting" gesture by detecting an intersecting line being drawn with a certain angle to a drawn line.

Optionally, the wireless device may support multiple roles, e.g. wireless dockee and wireless docking host. The direction in which the line is drawn may be used to assign such roles. In may be indicated that a device can only support one of the multiple roles at a time. The device rendering the user interface may support drawing directed arrows to represent the relation between the wireless dockee/master and wireless docking host/slave role. Additionally, the device may allow dynamically changing the direction of the arrows, causing a MD/WDH role switch or USB Host/Hub switch, e.g. using a message exchange to simulate a USB-on-the-GO role switch. This may not only lead to tearing down the session and re-establishing the session, but may also cause the underlying Wi-Fi P2P connection to be temporarily torn down. This is because some services for certain peripherals may require a certain role within a P2P group, e.g. P2P Group owner or P2P Client role. For example, the WDH may e.g. indicate value "GO" or "Cli" as the role it wants/needs to take in order to run e.g. a USB tunneling over Wi-Fi service. The MD's role may not match the indicated role, e.g. when WDH indicates it needs to become P2P GO, but MD is currently P2P GO for the P2P group between the MD and WDH. Then the MD will need to disconnect the current P2P connection with the WDH, and initiate a new P2P Connection between the MD and WDH before initiating a new session with the corresponding service. This may involve issuing a Provision Discovery request with Connection Capability set to "Cli" (0x02) or "GO" (0x03) opposite to the previous MD's role, or by the WDH setting the GO intent value to 15.

Optionally, when generating a system image, in addition to the lines drawn by the user to indicate sessions to peripherals, also other lines may be shown (e.g. thick lines in another color) to indicate an existing wireless connection or other relations between the devices. The device that generates the system image may be further configured to gather wireless signal parameters from the devices within wireless range capable of wireless docking to determine spatial location between the devices, and represents the relative spatial locations as part of the system image. This would make it easy for the user to understand the spatial relationship between multiple devices within range capable of wireless docking, and gets an increased understanding of signal strengths and when a device gets out of range.

Optionally, the mobile device may also notify the user that some or all required services are available. Such information about supported services may be made available through a data structure provided through probe responses, GAS frame exchange.

Such signals may contain several types of information, e.g. Docking Service Indication (see tables 1a, 1b), or Master device Identifier (could be MAC address or any suitable identifier).

TABLE 1a

Examples of Docking Service Indications

| Docking Service Indications (variable length string) | Comment |
| --- | --- |
| Wi-Fi Display | Offers video and audio rendering over Wi-Fi |
| Wi-Fi Direct Services PRINT | Offers printing over Wi-Fi |
| WSB Keyboard | WSB (Wireless Serial Bus) is USB offered over a Wi-Fi connection |
| WSB Mouse | |
| WSB Display | |
| WSB Audio | |
| WSB Video | USB Video over Wi-Fi; alternative way for video. The WDH may offer more than one way to make a video screen available for a master device and a master device may select the method it supports. |
| Internet Connection | Offers an internet connection through the WDH |
| WSB Camera | |
| WSB microphone | |

TABLE 1b

Examples of numerical Docking Service Indications

| Docking Service Indication Value in third field (1 ASCII character) | Docking Service that is indicated | Comment |
| --- | --- | --- |
| 0 | Wi-Fi Display | Offers video and audio rendering over Wi-Fi |
| 1 | Wi-Fi Direct Services PRINT | Offers printing over Wi-Fi |
| 2 | WSB Keyboard | WSB (Wireless Serial Bus) is USB offered over a Wi-Fi connection |
| 3 | WSB Mouse | |
| 4 | WSB Display | |
| 5 | WSB Audio | |
| 6 | WSB Video | USB over Wi-Fi; alternative way for video. The WDH may offer more than one way to make a video screen available for a master device and a master device may select the method it supports. |
| 7 | Internet Connection | Offers an internet connection through the WDH |
| 8 | WSB Camera | |
| 9 | WSB microphone | |

The provided information may consist of a list of docking services together with the status of each listed service. Status may be Available—Not Available, but the status may include more possibilities, such as 'WDH supports the service but service is in use by another master device'. The Service available signal consists of the following types of information
- Docking Service Indication (see table 2a and 2b)
- Master device Identifier (e.g. MAC address or any suitable identifier))

The Service Available Signal may be a new signal in Wi-Fi ('frame' in Wi-Fi Direct terms) or it may be embedded in existing Wi-Fi frames, such as
- Probe Request,
- Probe Response,
- Beacon frame,
- GAS (Generic Advertisement Service) Initial Request frame
- GAS Initial Response frame
- GAS Comeback Request Frame
- GAS Comeback Response Frame The GAS frames are also available as Protected GAS frames.

The Probe Request, Probe response and Beacon Frames comprise the attributes as explained before. New attributes and their Attribute values should be defined for the Docking Service Indication and the Master device Identifier. The Docking Service Indication values may be e.g. as shown in Table 2a, using strings, or in table 2b, using numeric values. Binary encoding or mixed encodings are also possible.

TABLE 2a

Examples of Docking Service Indications

| Status (1 ASCII character) | Docking Service (variable length string) | Comment |
| --- | --- | --- |
| 'A' or 'N' | Wi-Fi Display | Video and audio rendering over Wi-Fi is available ('A') or not available 'N' |
| 'A' or 'N' | Wi-Fi Direct Services PRINT | Printing over Wi-Fi is available ('A') or not available 'N' |
| 'A' or 'N' | WSB Keyboard | WSB keyboard over a Wi-Fi connection is available ('A') or not available 'N' |
| 'A' or 'N' | WSB Mouse | WSB mouse over a Wi-Fi connection is available ('A') or not available 'N' |
| 'A' or 'N' | WSB Display | WSB display over a Wi-Fi connection is available ('A') or not available 'N' |
| 'A' or 'N' | WSB Audio | WSB Audio over a Wi-Fi connection is available ('A') or not available 'N' |
| 'A' or 'N' | WSB Video | WSB Video over a Wi-Fi connection is available ('A') or not available 'N' |
| 'A' or 'N' | Internet Connection | Offers an internet connection through the WDH is available ('A') or not available 'N' |
| 'A' or 'N' | WSB Camera | WSB camera over a Wi-Fi connection is available ('A') or not available 'N' |
| 'A' or 'N' | WSB microphone | WSB microphone over a Wi-Fi connection is available ('A') or not available 'N' |

TABLE 2b

Examples of numeric Docking Service Indications

| Status (1 ASCII character) | Docking Service (2 ASCII characters) | Comment |
| --- | --- | --- |
| 'A' or 'N' | 00 | Video and audio rendering over Wi-Fi is available ('A') or not available 'N' |
| 'A' or 'N' | 01 | Printing over Wi-Fi is available ('A') or not available 'N' |
| 'A' or 'N' | 02 | WSB keyboard over a Wi-Fi connection is available ('A') or not available 'N' |
| 'A' or 'N' | 03 | WSB mouse over a Wi-Fi connection is available ('A') or not available 'N' |
| 'A' or 'N' | 04 | WSB display over a Wi-Fi connection is available ('A') or not available 'N' |
| 'A' or 'N' | 05 | WSB Audio over a Wi-Fi connection is available ('A') or not available 'N' |
| 'A' or 'N' | 06 | WSB Video over a Wi-Fi connection is available ('A') or not available 'N' |
| 'A' or 'N' | 07 | Offers an internet connection through the WDH is available ('A') or not available 'N' |
| 'A' or 'N' | 08 | WSB camera over a Wi-Fi connection is available ('A') or not available 'N' |
| 'A' or 'N' | 09 | WSB microphone over a Wi-Fi connection is available ('A') or not available 'N' |

Although the GAS frames are differently structured frames than the ones used for Probe Request frames, Probe Response frames and Beacon frames, the Service Available Signal may be added in ways similar as described above to the GAS Initial Request frame, GAS Initial Response frame, GAS Comeback Request frame, GAS Comeback Response Frame and their protected counterparts.

Figure 5:
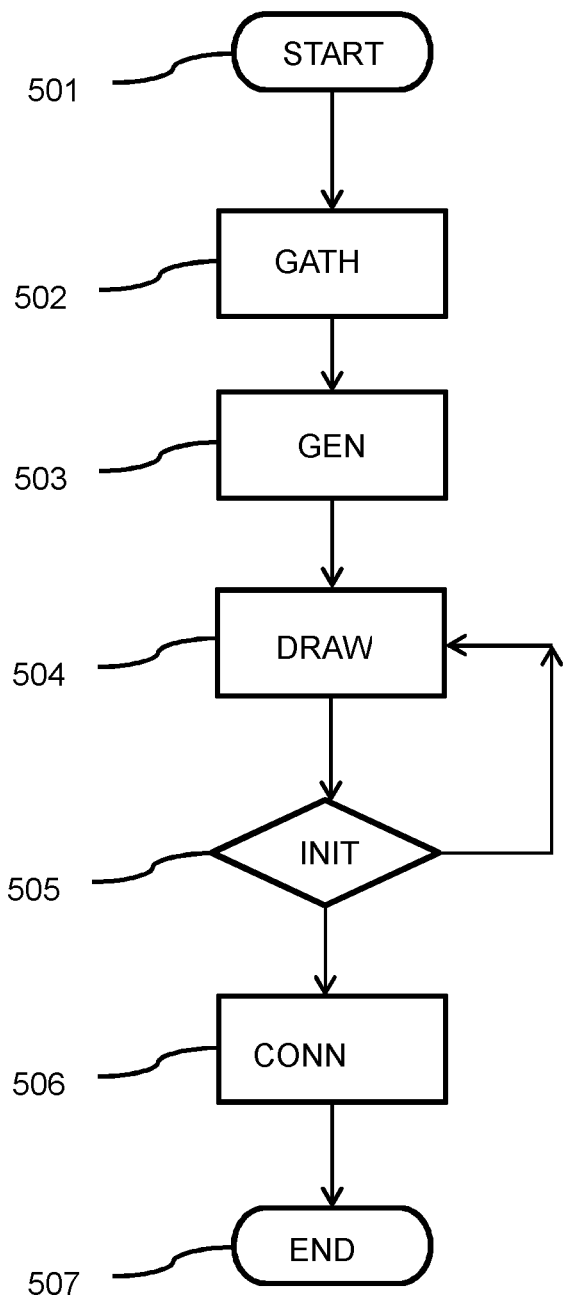
FIG. 5 shows a method of wireless communication for using a service at a wireless device.

FIG. 5 shows a method of wireless communication for using a service at a wireless device. The method enables wireless communication between a master device and one or more slave devices. The slave device and the master device have been elucidated with reference to FIGS. 1 and 2. The wireless device has a communication unit for the wireless communication, a processor coupled to the communication unit and arranged for said docking, and a graphical user interface comprising a display and an interaction element for receiving user input. The method initially starts at START 501, and first information about the devices and services in the wireless communication system is gathered at GATH 502. Subsequently, at GEN 503 a system image is generated for showing node elements and connection elements between the node elements, a respective node element graphically representing one of the master device, the slave device and the at least one service, and a respective connection element graphically representing a wireless connection. Next, at DRAW 504, a line drawing input is received via the interaction element, which is indicative of a line drawn in the system image by the user between selected node elements. Next, in INIT 505, upon receiving the completed line drawing input, a setup operation is initiated between selected devices corresponding to the selected node elements. Then, in CONN 506, the setup operation is performed by establishing a wireless connection between the selected devices. Finally the method ends at node END 507.

In practice the methods may be implemented in slave device software (slave device method) and master device software (master device method), e.g. in a so-called app. Such computer program products are for wireless docking between a slave device and a master device, and comprise a program operative to cause a processor to perform the slave device or master device method.

Although the invention has been mainly explained by embodiments using wireless docking, the invention is also suitable for any wireless system where a mobile device (having the master device role) wants to connect to a further wireless devices (having the slave device role) to connect to, use or share one or more peripherals or services. It is to be noted that the invention may be implemented in hardware and/or software, using programmable components.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention may be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A wireless communication system comprising at least two wireless devices including a master device providing a master function and a slave device providing a slave function, the slave device configured for providing at least one service and the master device configured for using the at least one service, the slave device and the master device configured for accommodating the at least one service via wireless communication, each device of the at least two wireless devices comprising:
   a communication processor configured for the wireless communication;
   a processor coupled to the communication processor and configured for accommodating the at least one service;
   a first device of the at least two wireless devices comprising a graphical user interface including a display, an interaction element for receiving user input, and a graphical control processor coupled to the display and the interaction element, wherein the graphical control processor is configured for:
      generating a system image for showing at least three node elements and connection elements between the node elements, a respective node element graphically representing at least one of the master device, the slave device and the at least one service, and a respective connection element graphically representing a wireless connection or service session that is established between the node elements;
      selecting devices to be connected by receiving, via the interaction element, a line drawing input indicative of a line drawn in the system image between two selected node elements of the at least three node elements;
      upon receiving the line drawing input, initiating a setup operation for the wireless connection or service session between the selected devices corresponding to the selected node elements, wherein the processor is configured for performing the setup operation by establishing the wireless connection or service session between the selected devices;
      receiving, via the interaction element, a line erasing input indicative of removing a selected connection element between selected node elements in the system image; and
      upon receiving the line erasing input, initiating a tear down operation that identifies the selected node elements and an existing connection or service session, wherein the processor is configured for removing the wireless connection or service session between the devices corresponding to the selected node elements.

2. The wireless communication system as claimed in claim 1, wherein the at least one service comprises accessing and using at least one of:
   a peripheral externally coupled to the slave device;
   an internal resource of the slave device;
   a network connected to the slave device.

3. The wireless communication system as claimed in claim 1, wherein a second device of the at least two wireless devices comprises a display, and the graphical control processor in the first device is configured for transferring the generated system image to the second wireless device, and the second wireless device is configured for receiving the generated system image and displaying the generated system image via the display.

4. A wireless device for use in a wireless communication system, the device comprising:
   a communication processor configured for wireless communication;
   a processor coupled to the communication processor and configured for accommodating a service; and
   a graphical user interface comprising a display, an interaction element for receiving user input and a graphical control processor coupled to the display and the interaction element, wherein the graphical control processor is configured for:
      generating a system image for showing at least three node elements and connection elements between the node elements, a respective node element graphically representing at least one of the master device, the slave device and the at least one service, and a respective connection element graphically representing a wireless connection or service session that is established between the node elements;
      selecting devices to be connected by receiving, via the interaction element, a line drawing input indicative of a line drawn in the system image between two selected node elements of the at least three node elements;
      upon receiving the line drawing input, initiating a setup operation for a wireless connection or service session between the selected devices corresponding to the selected node elements, wherein the processor is configured for performing the setup operation by establishing a wireless connection or service session between the selected devices;

receiving, via the interaction element, a line erasing input indicative of removing a selected connection element between selected node elements in the system image; and upon receiving the line erasing input, initiating a tear down operation that identifies the selected node elements and an existing connection or service session, wherein the processor is configured for removing the wireless connection or service session between the devices corresponding to the selected node elements.

5. The wireless device as claimed in claim 4, wherein the graphical control processor is configured for selecting a master or slave function by receiving, via the interaction element, a line direction input indicative of an origin node where the line drawn in the system image originated or a destination node where the line drawn in the system image ended, wherein the processor is configured for, upon receiving the line direction input, performing the master function when the device corresponds to the origin node or the slave function when the device corresponds to the destination node.

6. The wireless device as claimed in claim 4, wherein the graphical control processor is configured for selecting a master or slave function by receiving, via the interaction element as the line direction input, a direction reversal input indicative of a line drawn from a pre-existing destination node to a pre-existing origin node of a pre-existing connection, and the processor is configured for, upon receiving the line direction input, changing a master function of the pre-existing origin node into a slave function when the device corresponds to the pre-existing origin node or changing a slave function of the pre-existing destination node into a master function when the device corresponds to the pre-existing destination node.

7. The wireless device as claimed in claim 4, wherein
the processor is configured for wirelessly receiving information from another device of the at least two wireless devices about its services, wireless connection capabilities or ongoing connections, and
the processor is configured for wirelessly transmitting information to another device of the at least two wireless devices about its services, wireless connection capabilities or ongoing connections.

8. The wireless device as claimed in claim 7, wherein the information is at least one of pre-association information in beacon frames, probe response frames in response to probe requests, and in GAS frames according to Wi-Fi standard IEEE 802.11.

9. The wireless device as claimed in claim 8, wherein the information in the frames is extended with service specific information elements or attributes that provide service specific information.

10. The wireless device as claimed in claim 9, wherein said service specific information is indicative of a graphical icon to be used in the respective node element in the system image.

11. The wireless device as claimed in claim 4, wherein the graphical control processor is configured for accessing a database of icons for retrieving an icon for generating the node element corresponding to a respective master device, slave device or service.

12. The wireless device as claimed in claim 4, wherein the graphical control processor is configured for determining spatial distance between the wireless devices and representing the relative spatial distances in the system image.

13. A method of initiating wireless communication for use in a wireless device, the wireless device comprising a communication processor configured for the wireless communication, a processor coupled to the communication processor and configured for accommodating a service, and a graphical user interface comprising a display and an interaction element for receiving user input, the method comprising:

generating a system image for showing at least three node elements and connection elements between the node elements, a respective node element graphically representing at least one of the master device, the slave device and the at least one service, and a respective connection element graphically representing a wireless connection or service session that is established between the node elements;

selecting devices to be connected by receiving, via the interaction element, a line drawing input indicative of a line drawn in the system image between two selected node elements of the at least three node elements;

upon receiving the line drawing input, initiating a setup operation for a wireless connection or service session between the selected devices corresponding to the selected node elements, wherein the processor is configured for performing the setup operation by establishing a wireless connection or service session between the selected devices receiving, via the interaction element, a line erasing input indicative of removing a selected connection element between selected node elements in the system image; and upon receiving the line erasing input, initiating a tear down operation that identifies the selected node elements and an existing connection or service session, wherein the processor is configured for removing the wireless connection or service session between the devices corresponding to the selected node elements.

14. A non-transitory computer-readable medium having one or more executable instructions stored thereon, which when executed by a processor, cause the processor to perform a method for initiating wireless communication for use in a wireless device, the wireless device comprising a communication processor configured for the wireless communication, a processor coupled to the communication processor and configured for accommodating a service, and a graphical user interface comprising a display and an interaction element for receiving user input, the method comprising:

generating a system image for showing at least three node elements and connection elements between the node elements, a respective node element graphically representing at least one of the master device, the slave device and the at least one service, and a respective connection element graphically representing a wireless connection or service session that is established between the node elements;

selecting devices to be connected by receiving, via the interaction element, a line drawing input indicative of a line drawn in the system image between two selected node elements of the at least three node elements;

upon receiving the line drawing input, initiating a setup operation for a wireless connection or service session between the selected devices corresponding to the selected node elements, wherein the processor is configured for performing the setup operation by establishing a wireless connection or service session between the selected devices receiving, via the interaction element, a line erasing input indicative of removing a selected connection element between selected node elements in the system image; and upon receiving the line erasing input, initiating a tear down operation that identifies the selected node elements and an existing connection or service session, wherein the processor is configured for removing the wireless connection or service session between the devices corresponding to the selected node elements.

\* \* \* \* \*